SPLICING DEVICE FOR MAGNETIC TAPE

Filed June 4, 1952 4 Sheets-Sheet 1

INVENTOR.
RALPH M. NICHOLS
BY
Parrott, Richards & Sims
ATTORNEYS

Feb. 9, 1954 R. M. NICHOLS 2,668,576

SPLICING DEVICE FOR MAGNETIC TAPE

Filed June 4, 1952 4 Sheets-Sheet 2

INVENTOR.
RALPH M. NICHOLS

BY

Parrott, Richards & Sims
ATTORNEYS

Feb. 9, 1954 R. M. NICHOLS 2,668,576

SPLICING DEVICE FOR MAGNETIC TAPE

Filed June 4, 1952 4 Sheets-Sheet 3

INVENTOR.
RALPH M. NICHOLS
BY
Parrott, Richards & Sims
ATTORNEYS

Feb. 9, 1954 R. M. NICHOLS 2,668,576

SPLICING DEVICE FOR MAGNETIC TAPE

Filed June 4, 1952 4 Sheets-Sheet 4

INVENTOR.
RALPH M. NICHOLS
BY
Parrott, Richards & Sims
ATTORNEYS

Patented Feb. 9, 1954 2,668,576

UNITED STATES PATENT OFFICE 2,668,576

SPLICING DEVICE FOR MAGNETIC TAPE

Ralph M. Nichols, Greenville, S. C., assignor to Bob Jones University, a corporation of Tennessee Application June 4, 1952, Serial No. 291,663

7 Claims. (Cl. 154—42.3)

This invention relates generally to splicing devices, and more particularly to an improved form of the type of splicing device for splicing magnetic tape disclosed in copending application Serial No. 208,294, filed January 29, 1951.

Splicing devices of this sort are adapted, as described in the above noted copending application, for editing magnetic tape on which sound is commonly recorded in the production of motion pictures, and on which it has recently also been found possible to record the picture too. In the course of editing such tape recordings, the process is of course greatly facilitated by making the actual operation of forming the splice easy and convenient once the point for a required splice has been determined, but it is also highly important that the splice be made perfectly and in a way that avoids interruption or marring of the recording carried by the tape.

In the above noted copending application, the splicing device disclosed is arranged uniquely to form a diagonal splice in the tape so that the splice does not noticeably affect the recording. By the present invention a similar diagonal splicing arrangement is embodied in an improved means by which the splice can be made with consistent perfectness and with substantially greater facility and convenience. This improved splicing device of the present invention is described in further detail below in connection with the accompanying drawings, in which.

Figure 1:
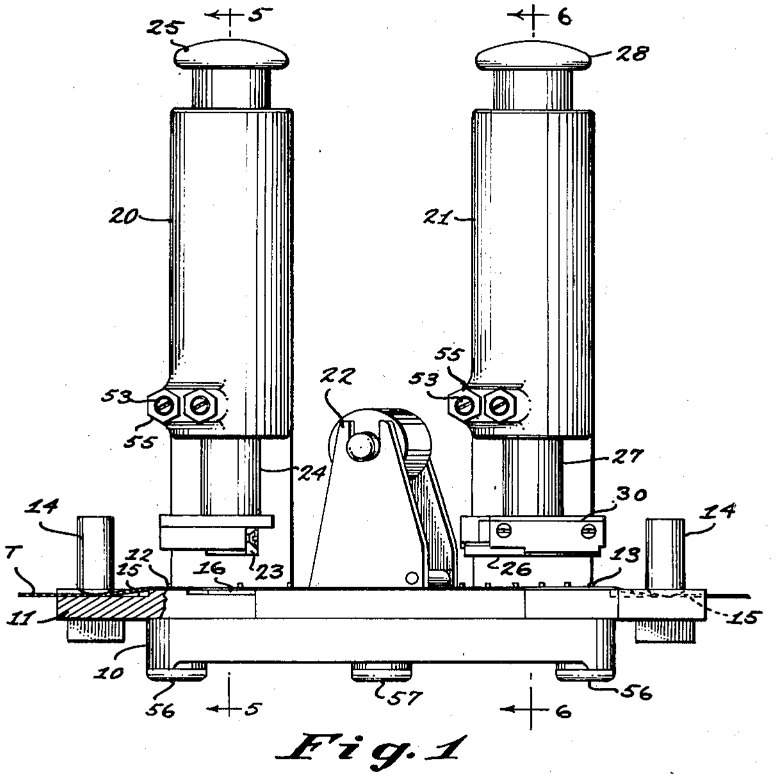
Fig. 1 is a front elevation, partly in section, of a splicing device embodying the present invention.
Figure 2:
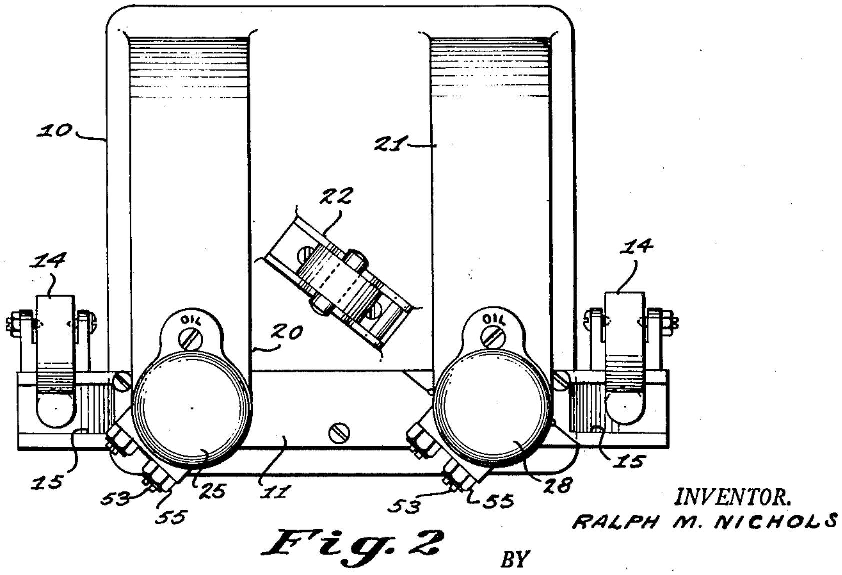
Fig. 2 is a plan view corresponding to Fig. 1.
Figures 3, 4:
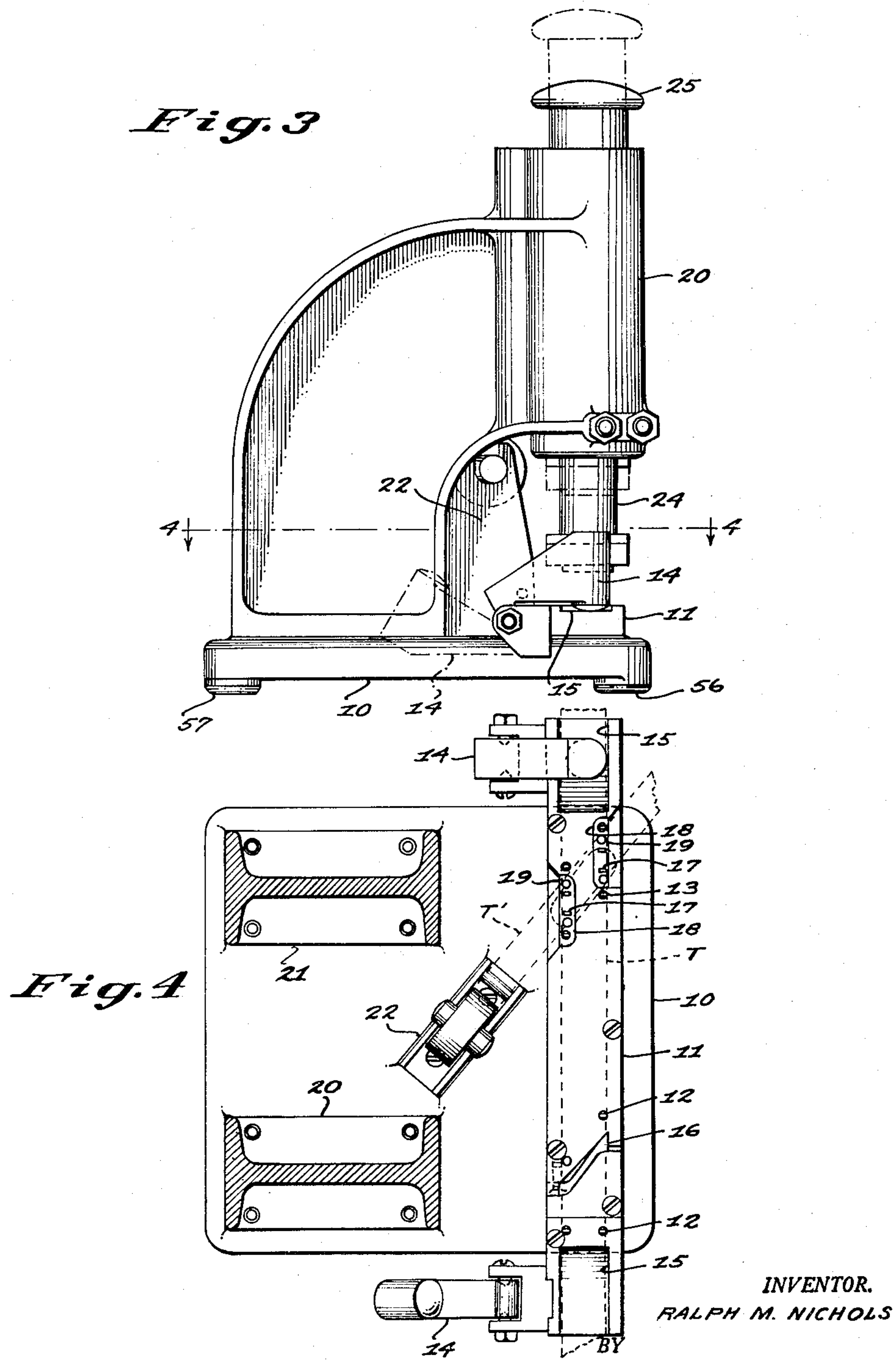
Fig. 3 is a left side elevation corresponding to Fig. 1.
Fig. 4 is a further plan view shown with the upper portion of the first and second plunger means removed at the line 4—4 in Fig. 3.
Figure 11:
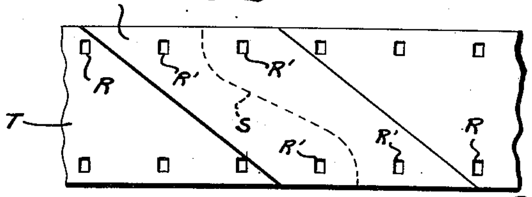
Fig. 11 is a fragmentary detail illustrating the arrangement of a tape splice formed by the splicing device of the present invention.

With reference now in detail to the drawings, and more particularly at first to Figs. 1, 2 and 3, the illustrated embodiment of the splicing device of the present invention is shown as comprising a base member 10 on which a splicing block 11 is fixed transversely adjacent the front edge thereof. On this splicing block 11 locating pins are arranged as at 12 and 13 for maintaining magnetic tape T at selected positions on the block 11 by engagement with the register holes R therein; the locating pins 12 being arranged at a first selected position for maintaining the tape T in place as it is cut, and the locating pins 13 being arranged at a second selected position for maintaining the cut tape T in place as a splice is completed by the application of splicing tape T' (compare Fig. 11), all as is described in detail further below.

The splicing block 11 is also fitted with weighting arms 14 which are pivoted adjacent the ends of the block 11 for weighting the tape T in engagement with the locating pins 12 and 13, the top face of the splicing block 11 having grooves formed therein adjacent its ends as at 15 which have a width corresponding to the width of the magnetic tape T and in which grooves 15 the tape T is pressed by the arms 14 when in weighting position so that the tape T is thereby further maintained in proper position for the splicing operation. The pivoted disposition of the weighting arms 14 on the splicing block 11 allows them to be manipulated between this weighting position noted above and a retracted position clear of the splicing block 11 (compare Figs. 3 and 4) so that they may be easily displaced to avoid any interference with handling of the tape T as it is inserted and removed in the course of carrying out a splicing operation with the splicing device of the present invention.

The splicing block 11 is also adapted for the splicing operation by a stationary shear blade 16 fitted thereon at the first selected position defined by the locating pins 13, and by cutting die apertures 17 formed in inserts 18 which also form cutting edges 19 at the sides of the splicing block 1. The stationary shear blade 16 is formed and is disposed on the splicing block 11 to make a generally diagonal splicing cut S in the tape T (compare Fig. 11), the splicing cut S running diagonally for a major portion of the tape width but curving to a transverse course as each tape edge is approached so as to avoid sharply pointed tape ends at the cut which would be relatively difficult to handle in completing the splice. It should also be noted that the splicing cut S runs between the register holes R in the tape T, the locating pins 12 serving to locate the splicing cut S at this position as it is made.

The splicing device of the present invention further comprises a first plunger means 20 mounted on the base member 10 to extend above the splicing block 11 at the first selected position defined by the locating pins 12, a second plunger means 21 similarly mounted at the second selected position defined by the locating pins 13, and a splicing tape dispenser 22 mounted on the base member 10 in spaced relation between the first and second plunger means 20 and 21. The first plunger means 20 carries a movable shear blade 23 arranged for cutting action with the previously noted stationary shear blade 16 fitted on the splicing block 11, the movable shear blade 23 being mounted at the lower end of a plunger rod 24 which may be depressed from an upper operating knob 25 to force the movable shear blade 23 downwardly so that the diagonal splicing cut S is made in cooperation with the stationary shear blade 16. The splicing tape dispenser 22 is in turn arranged between the plunger means 20 and 21 with a diagonal disposition for directing the withdrawal of splicing tape T′ therefrom across the splicing block 11 at the second selected position in generally spaced parallel alignment with the diagonal cutting disposition of the shear blades 16 and 23 at the first selected position (compare Fig. 4).

The second plunger means 21 is adapted for applying a length of splicing tape T′ from the dispenser 22 to join the abutting ends of magnetic tape T cut at the first selected position by operation of the first plunging means 20, and for this purpose the second plunger means 21 is fitted with a yieldable presser plate 26, which is disposed at the lower end of a plunger rod 27 to come in contact first with the top face of the splicing block 11 upon depression of the plunger means 21 from an upper operating knob 28. This lower end of the plunger rod 27 for the second plunger means 21 is also fitted with cutting punches 29 and trimming blades 30 disposed in relation to the previously mentioned cutting die apertures 17 and cutting edges 19 fitted in the splicing block 11 at this second selected position, and as the yieldable presser plate 26 moves up upon further depression of the second plunger means 21, these cutting punches 29 and the trimming blades 30 function to reform the register holes that have been covered by the splicing tape T′ adjacent each side of the splicing cut S as at R′ and to trim the splicing tape T′ evenly at each side edge of the magnetic tape T.

Figure 6:
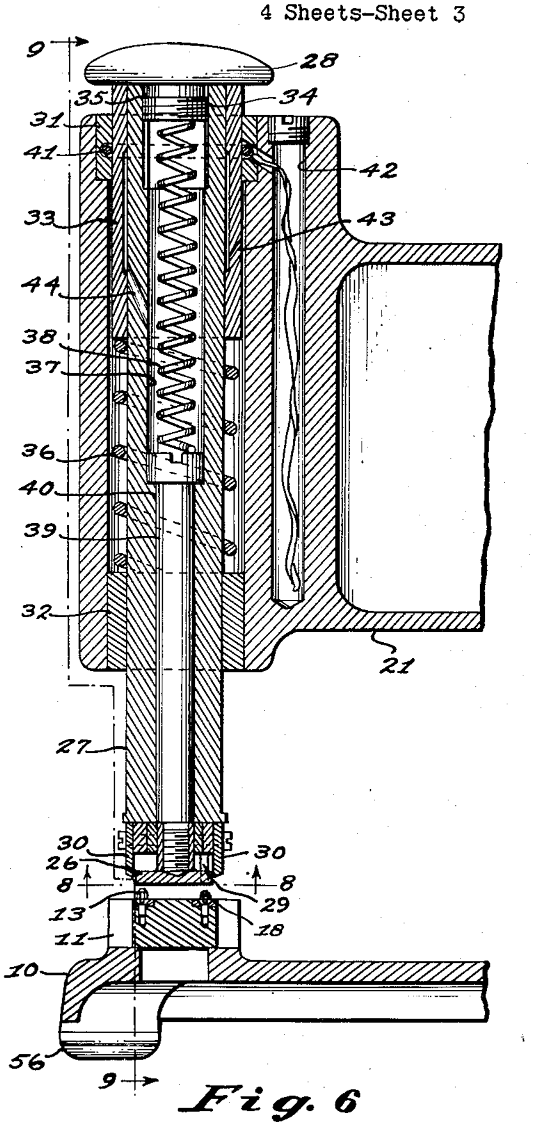
Fig. 6 is a vertical section of the second plunger means taken substantially on the line 6—6 in Fig. 1.
Figure 7:
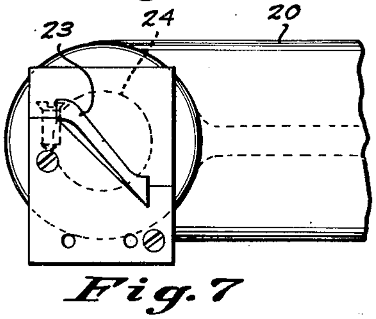
Fig. 7 is a fragmentary detail of the bottom face of the first plunger means as seen from the line 7—7 in Fig. 5.
Figure 8:
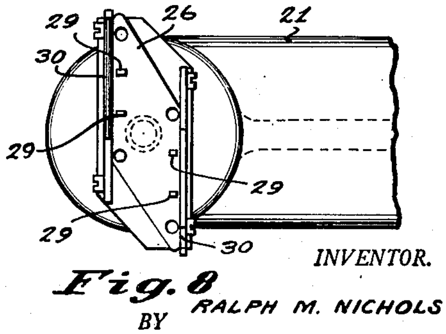
Fig. 8 is a fragmentary detail of the bottom face of the second plunger means as seen from the line 8—8 in Fig. 6.
Figure 9:
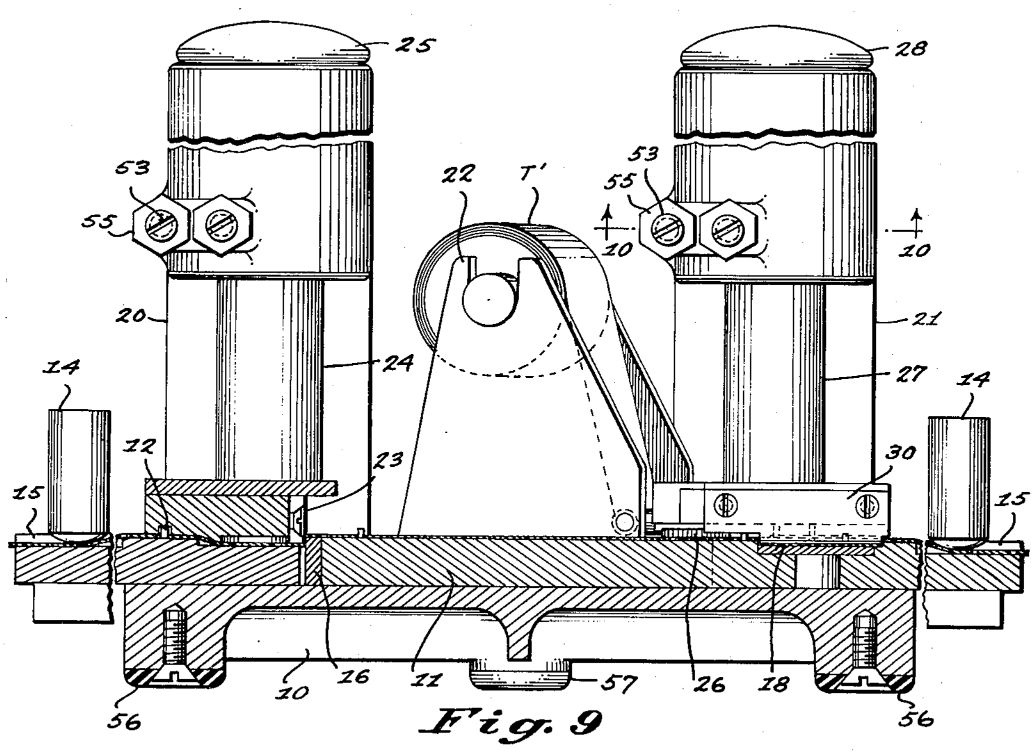
Fig. 9 is a further front elevation partly in section as indicated by the line 9—9 in Figs. 5 and 6.

The second plunger means 21 is arranged for this operation as shown in Fig. 6 by a sliding disposition in top and bottom bearing elements 31 and 32 of the plunger rod 27 and the operating knob 28 which has a sleeve portion 33 fitting over the upper end of the plunger rod 27 and is held in place by a screw threaded shank 34 engaging a threaded internal bore portion in the plunger rod 27. Between the bottom bearing element 32 and the lower end face of the operating knob sleeve portion 33 a compression spring 36 is disposed over the plunger rod 27 for maintaining the plunger means 21 normally in a raised position above the splicing block 11. Internally of the plunger rod 27, and beyond the upper threaded bore 35, a second bore 37 of reduced diameter continues to contain a second compression spring 38 between the bottom face of the operating knob shank 34 and the top face of a presser plate positioning screw 39, the head of which is received in this second bore 37 to limit its downward movement, and the remainder of which extends through a third bore 40 to engage the presser plate 26 and position it yieldably for applying the splicing tape T′ as already noted above.

In order to provide for adequate lubrication of the plunger means 21, the upper bearing element 31 is grooved and apertured to receive a wick element 41 extending from a lubricant supply chamber 42 in the plunger means 21 so that lubricant is fed continually to this top bearing element 31 and therefrom to the exterior surface of the operating knob sleeve portion 33, which is in turn formed with at least one downwardly directed aperture 43 through its side wall to feed lubricant inwardly to the exterior surface of the plunger rod 27 where a further downwardly directed aperture 44 opens into the internal bore 37 for directing a lubricant supply to the presser plate screw 39.

Figure 5:
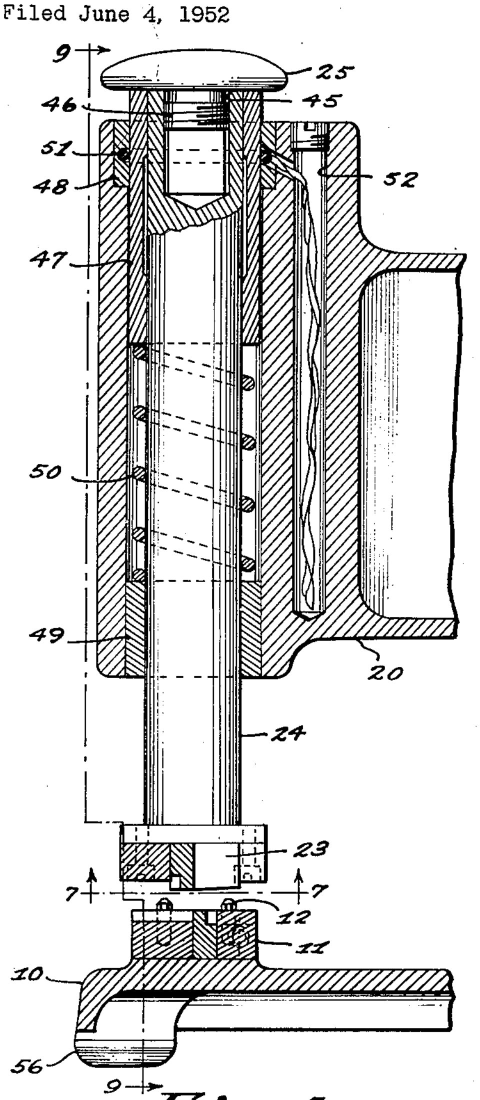
Fig. 5 is a vertical section of the first plunger means taken substantially on the line 5—5 in Fig. 1.

The first plunger means 20 is similarly arranged as shown in Fig. 5, except that it has only one internal bore 45 at the upper end of its plunger rod 24 for receiving the threaded shank 46 of the operating knob 25, which is again formed with a sleeve portion 47 fitting over the top end of the plunger rod and slidably mounted in a top bearing element 48, with a bottom bearing element 49 positioning the lower portion of the plunger rod 24 and supporting a compression spring 50 against the bottom end face of the operating knob sleeve 47 to maintain the plunger means 20 normally in raised position. Also, the top bearing element 48 is again grooved and apertured to receive a wick element 51 that extends from a lubricant supply chamber 52 to maintain a constant lubrication feed for the plunger means 20.

Figure 10:
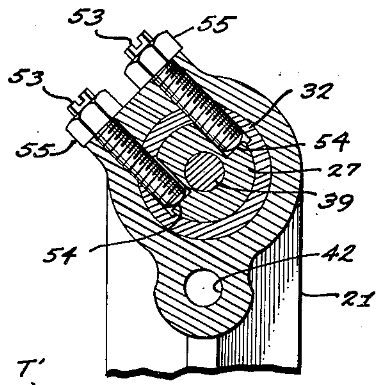
Fig. 10 is a transverse sectional detail of the second plunger means taken substantially on the line 10—10 in Fig. 9.

In order to maintain the plunger rods 24 and 27 of the respective plunger means 20 and 21 properly disposed to align the cutting elements carried thereby with the related cutting elements on the splicing block 11, each plunger means 20 and 21 is further provided with opposed adjusting screws 53 as shown best in Fig. 10 which illustrates the arrangement for the second plunger means 21. These adjusting screws 53 are arranged to extend through the lower bearing element (32 as seen in Fig. 10) and bear against recessed faces 54 of the plunger rod 27 as shown in Fig. 10. As a result, the opposed adjusting screws 53 make it possible to rotate the plunger rod 27 slightly with respect to the bearing element 32 and thereby adjust nicely the alignment of the splice forming cutting elements, lock nuts 55 being provided for fixing the opposed screws 53 in a given adjusted position.

The operation of the splicing device of the present invention for forming a splice consists in placing the tape T on the splicing block 11 with the register holes R thereof engaged by the locking pins 12 and 13 so that the point determined for a splicing cut is positioned at the first plunger means 20. Depression of the operating knob 25 thereupon results in making a diagonal splicing cut S in the tape T at the point desired. After a second splicing cut S has similarly been made to remove a portion of the tape T in accordance with the editing decided upon, the remaining ends of the tape portions to be retained are again positioned on the splicing block 11 in engagement with locating pins 12 and 13 so that these tape ends are arranged in abutting relation at the second plunger means 21. A length of splicing tape T' is then withdrawn from the dispenser 22 and positioned lightly by hand across the abutting ends of the magnetic tape T to be spliced, and the second plunger means 21 is depressed, whereupon the presser plate 26 is forced downwardly first against the top face of the splicing block 11 to apply the length of splicing tape T' (which at this time is still extending from the dispenser 22) firmly and smoothly to join the abutting tape ends, and after which the cutting punches 29 and trimming blades move downwardly past the yieldable presser plate 26 to reform the register holes R' and trim the splicing tape T' at each side edge of the magnetic tape T (the splicing tape T' being cut loose from the dispenser 22 at this time).

It should also be noted that the splicing device may be readily arranged according to the present invention so that all of the tape contacting elements thereof except for the several cutting elements may be formed of non-magnetic material and thereby provide for handling magnetic tapes to the best advantage. Also, it should be noted that the base member 10 is arranged according to the present invention with a stand foot 56 disposed beneath each end of the splicing block 11 and with a third stand foot 57 disposed centrally adjacent the rear edge thereof so that a sturdy tripod support is provided that allows firm dispostion of the splicing device for operation.

The present invention has been described above for purposes of illustration only and is not intended to be limited by this description or otherwise except as defined by the appended claims.

I claim:

1. A splicing device for magnetic tape comprising a base member, a splicing block fixed on said base member, means including locating pins arranged on said splicing block for maintaining magnetic tape at selected positions thereon, a stationary shear blade fitted in said splicing block diagonally thereof at a first selected position for cutting said magnetic tape diagonally between the register holes therein, cutting die apertures formed in said splicing block at a second selected position in correspondence with the register holes of said magnetic tape immediately adjacent each side of a cut made in said magnetic tape at said first position, a first plunger means mounted on said base member to extend above said splicing block at said first position and a second plunger means similarly mounted at said second position, a movable shear blade carried by said first plunger means for cutting action with said stationary blade, and a splicing tape dispenser mounted on said base member in spaced relation between said first and second plunger means; said dispenser having a diagonal disposition for directing the withdrawal of splicing tape therefrom across said splicing block at said second position in spaced parallel alignment with the diagonal cutting disposition of said shear blades at said first position; said second plunger means carrying a presser plate for applying a length of splicing tape from said dispenser to join at said second position abutting ends of magnetic tape cut at said first position, cutting punches arranged in relation to said cutting die apertures for reforming register holes through said length of splicing tape, and trimming blades for trimming said diagonally applied length of splicing tape at each side edge of said magnetic tape; and said splicing block being recessed and fitted with stationary trim blades for cooperation with the trimming blades of said second plunger means.

2. A splicing device as defined in claim 1 and further characterized in that each of said plunger means incorporates a housing, a cylindrical plunger positioned at top and bottom bearing elements for vertical sliding movement in said housing, yieldable means for maintaining said plunger normally at a raised position, and opposed adjusting screws carried by said housing at said bottom bearing element for circularly adjusting and fixing the disposition of said plunger in said housing in relation to said splicing block, said plunger being recessed intermediately of its length to present abutment faces for sliding contact with said adjusting screws.

3. A splicing device as defined in claim 2 and further characterized in that said housing is formed with a lubricant supply chamber, said top bearing element is formed with a lubrication channel communicating with said chamber and opening in the bearing face thereof, and a wick element is disposed to extend from said chamber through said channel.

4. A splicing device as defined in claim 1 and further characterized in that said splicing block is fixed along one side edge of said base member, and said base member is fitted with a stand foot disposed adjacent each end of said splicing block and a third stand foot disposed centrally adjacent the opposite side edge thereof.

5. A splicing device as defined in claim 1 and further characterized in that all of the tape-contacting elements thereof except said shear blades, trimming blades and register hole reforming means, are formed of non-magnetic material.

6. A splicing device as defined in claim 1 and further characterized in that said means for maintaining magnetic tape at selected positions on said splicing block further comprises weighting arms pivoted adjacent each end of said splicing block at a side thereof for movement between a retracted position clear of said block and a weighting position depending against the top face of said block.

7. A splicing device as defined in claim 6 and further characterized in that said splicing block is formed at the ends thereof with grooves of the width of said magnetic tape and in which grooves said magnetic tape is pressed by said arms when in weighting position.

RALPH M. NICHOLS.

References Cited in the file of this patent

UNITED STATES PATENTS

| Number | Name | Date |
|---|---|---|
| 2,446,576 | DeVry | Aug. 10, 1948 |
| 2,565,009 | Wallingsford | Aug. 21, 1951 |